United States Patent [19] [11] 3,733,442
Lee [45] May 15, 1973

[54] HOLD CIRCUIT FOR MULTI-LINE KEY TELEPHONE SYSTEM

[75] Inventor: Allan Yook Foo Lee, London, Ontario, Canada

[73] Assignee: Northern Electric Company Limited, Montreal, Quebec, Canada

[22] Filed: Jan. 18, 1971

[21] Appl. No.: 107,352

[52] U.S. Cl. .......... 179/99
[51] Int. Cl. .......... H01m 1/72
[58] Field of Search .......... 179/99, 42, 43, 81

[56] References Cited

UNITED STATES PATENTS

| | | | |
|---|---|---|---|
| 2,810,016 | 10/1957 | Knittle | 179/99 |
| 2,862,062 | 11/1958 | Carter | 179/99 |
| 3,395,256 | 7/1968 | Limiero et al. | 179/99 |
| 2,069,038 | 1/1937 | Labaugh | 179/81 R |
| 2,306,203 | 12/1942 | Anderson | 179/81 R |
| 2,341,027 | 2/1944 | Edwards | 179/81 R X |

*Primary Examiner*—William C. Cooper
*Attorney*—John E. Mowle

[57] ABSTRACT

A multi-line key telephone system comprising a plurality of telephone stations each of which has access to a plurality of telephone lines. Individual line-holding circuits are provided, which are connected to or connectable with any one of the individual line circuits and any one of the individual telephone station circuits. Each holding circuit has a resistive coil in series with a reed switch with an equivalent resistance exceeding the resistance of any one telephone station circuit. In parallel to the reed switch in each holding circuit is a circuit path which goes through the respective telephone line key, a common hold key, and the hook switch. In each station operation of the hook switch and depression of a selected line key connects the telephone circuit to a selected telephone line. Subsequently operation of the common hold key electrically completes the said circuit path and so shorts the reed switch, releases the said line key, and then energizes the coil to lock the holding circuit across the said telephone line. Further connection of any telephone circuit to the telephone line sufficiently de-energizes the coil to release the reed switch and disconnect the holding circuit from the telephone line.

3 Claims, 13 Drawing Figures

INVENTOR
ALLAN YOOK FOO LEE
BY Neill M. S. Johnston
Agent

INVENTOR
ALLAN YOOK FOO LEE
BY Neill M. S. Johnston
Agent

INVENTOR
ALLAN YOOK FOO LEE

BY Neil M. S. Johnston
Agent

INVENTOR
ALLAN YOOK FOO LEE
BY Neil M. S. Johnston
Agent

INVENTOR
ALLAN YOOK FOO LEE

BY Neill M.S. Johnston
Agent

INVENTOR
ALLAN YOOK FOO LEE

BY Neill M.S. Johnston

Agent

INVENTOR
ALLAN YOOK FOO LEE

BY Neill M. S. Johnston

Agent

INVENTOR
ALLAN YOOK FOO LEE
BY Neill M. S. Johnston
Agent

INVENTOR
ALLAN YOOK FOO LEE
BY Neill M.S. Johnston
Agent

INVENTOR
ALLAN YOOK FOO LEE

BY: Neill M.S. Johnston
Agent

INVENTOR
ALLAN YOOK FOO LEE
BY Neill M. S. Johnston
Agent

INVENTOR
ALLAN YOOK FOO LEE
BY: Neill M.S. Johnston
Agent

INVENTOR
ALLAN YOOK FOO LEE

BY Neill M.S. Johnston
Agent

HOLD CIRCUIT FOR MULTI-LINE KEY TELEPHONE SYSTEM

This invention relates to telephone systems and more particularly to subscribers key telephone station circuits.

With the advent of key telephone systems the automatic switching equipment and operators previously required for small automatic and manual private branch exchanges were dispensed with. These key telephone systems are provided with lamps and keys located at each of the stations on the subscribers premises. Each lamp and key correspond to a particular line at any one of a number of stations so that it is possible to receive an indication of an incoming call over the individual lines at any one of these stations with which the particular line is connected in multiple. If the station responding is not the one to which the calling party wishes to communicate the individual holding circuits associated with each particular line and with which each particular station was provided would hold the incoming call on the operation of a key at the answering station until the necessary response is obtained. Circuits that provide such holding and releasing functions are known in the art. These circuits however had their shortcomings in that some circuits require a complexity of switching relays and other circuits are provided with manual means of releasing the holding circuit only at the station where the telephone call is being held. A further difficulty in holding circuits that employ manual means is that replacement of the hand set on hook inadvertently releases all holding circuits and disconnects all their associated telephone lines without regard to necessity.

In addition to the circuit complexity and operational difficulties which have been encountered the manufacturing of keys with the required mechanical tolerances to ensure reliable holding and releasing has presented considerable cost and difficulty.

It is therefore the object of this present invention to improve key telephone systems.

A more particular object of the invention is to provide key telephone systems in which there is a visible indication of the operation of a holding circuit and the holding circuit is automatically released in response to connection of any telephone station circuit to the telephone in the multiple system.

It is another object of the invention to provide economical and reliable key telephone systems.

In accordance with these objects there is provided in accordance with the present invention in a telephone switching system, a plurality of telephone station circuits connectable to all the said telephone line circuits, each said telephone station circuit including hook switch contacts, a plurality of line keys, one individual to each of said telephone line circuits in each of said telephone station circuits, a plurality of line-holding circuits for connecting preselected corresponding ones of said line-holding circuits to each of said telephone line circuits, a hold key common to all of said line-holding circuits for actuation of a selected one of said line-holding circuits, local signalling means individual to each telephone line circuit having a first mode and a second mode of operation, means responsive to ringing current from a remote location for initiating operation of said local signalling means into said first mode of operation; means responsive to operation of said hold key subsequent to operation of said hook switch and line key to change said signalling means from said first mode of operation to said second mode; and means responsive to the operation of said hold key for connecting the respective hold circuit across a selected telephone line circuit and responsive to operation of the respective line key and hook switch contacts to disconnect said hold circuit.

These and other features of the invention will be more fully understood from the following descriptions and drawings in which various preferred embodiments are illustrated by way of example and in which.

Figure 7:
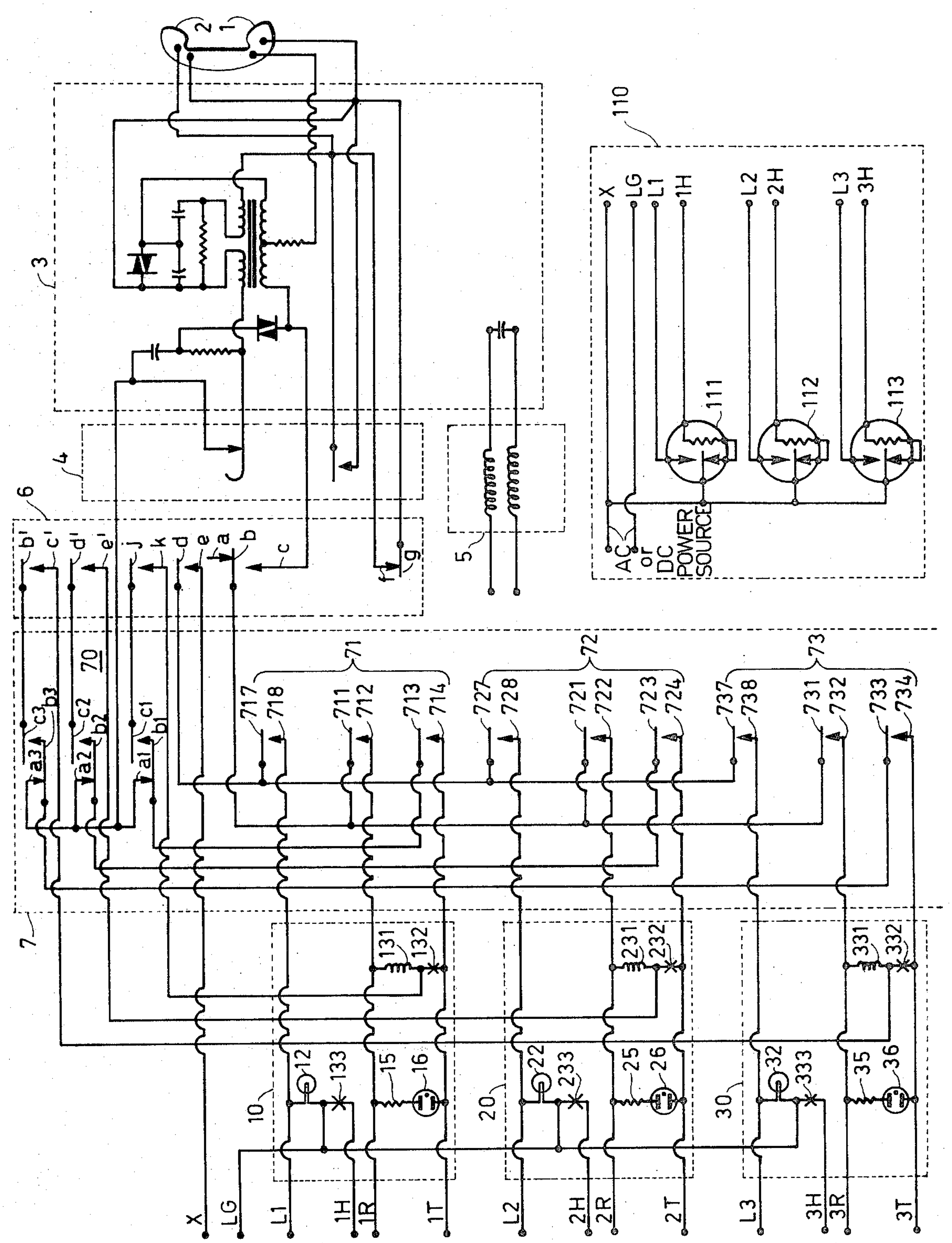
FIG. 7 shows an alternative circuit to that shown in FIG. 6 with different connections to different hook switch and different hold key.
Figure 9A:
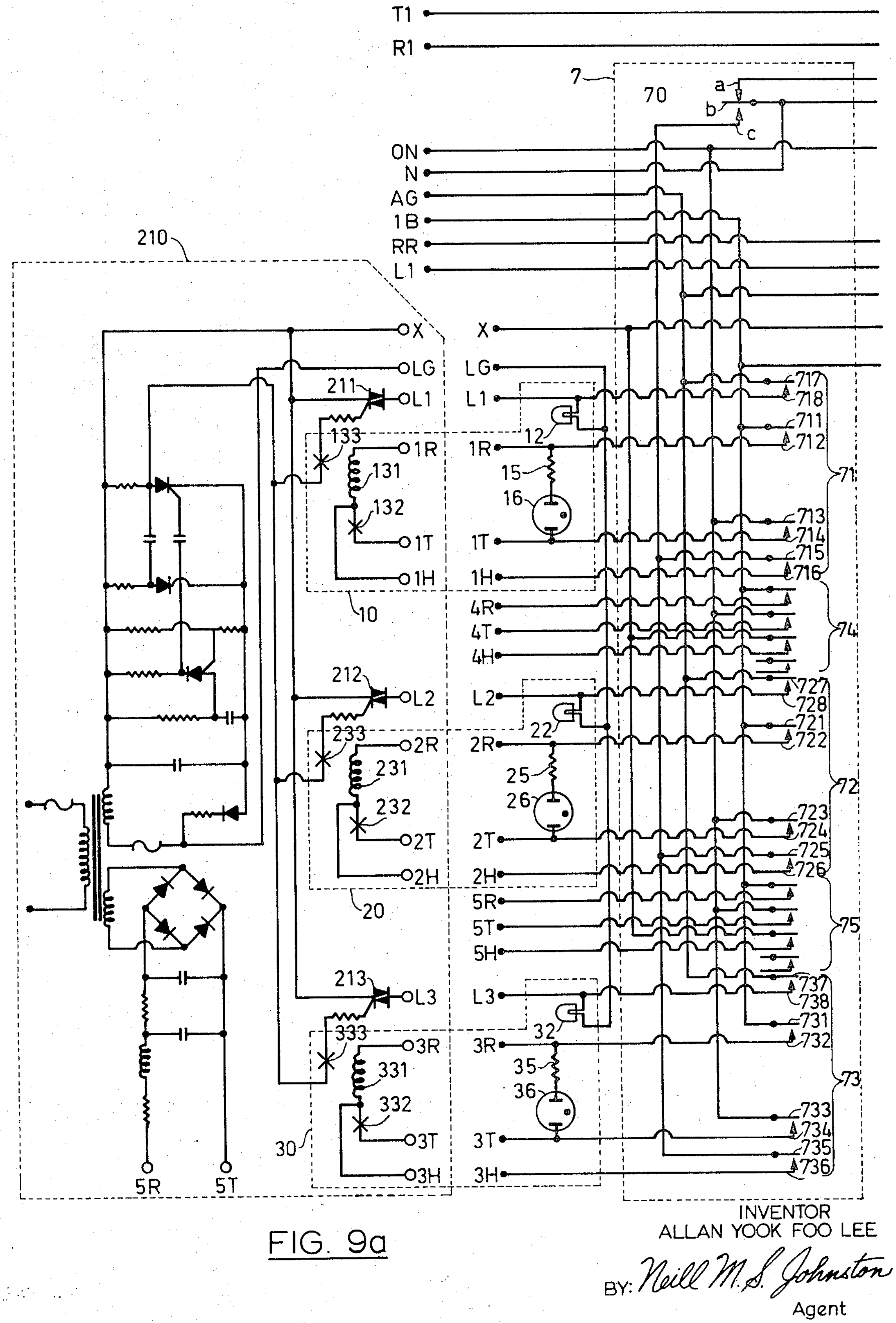
Figure 9B:
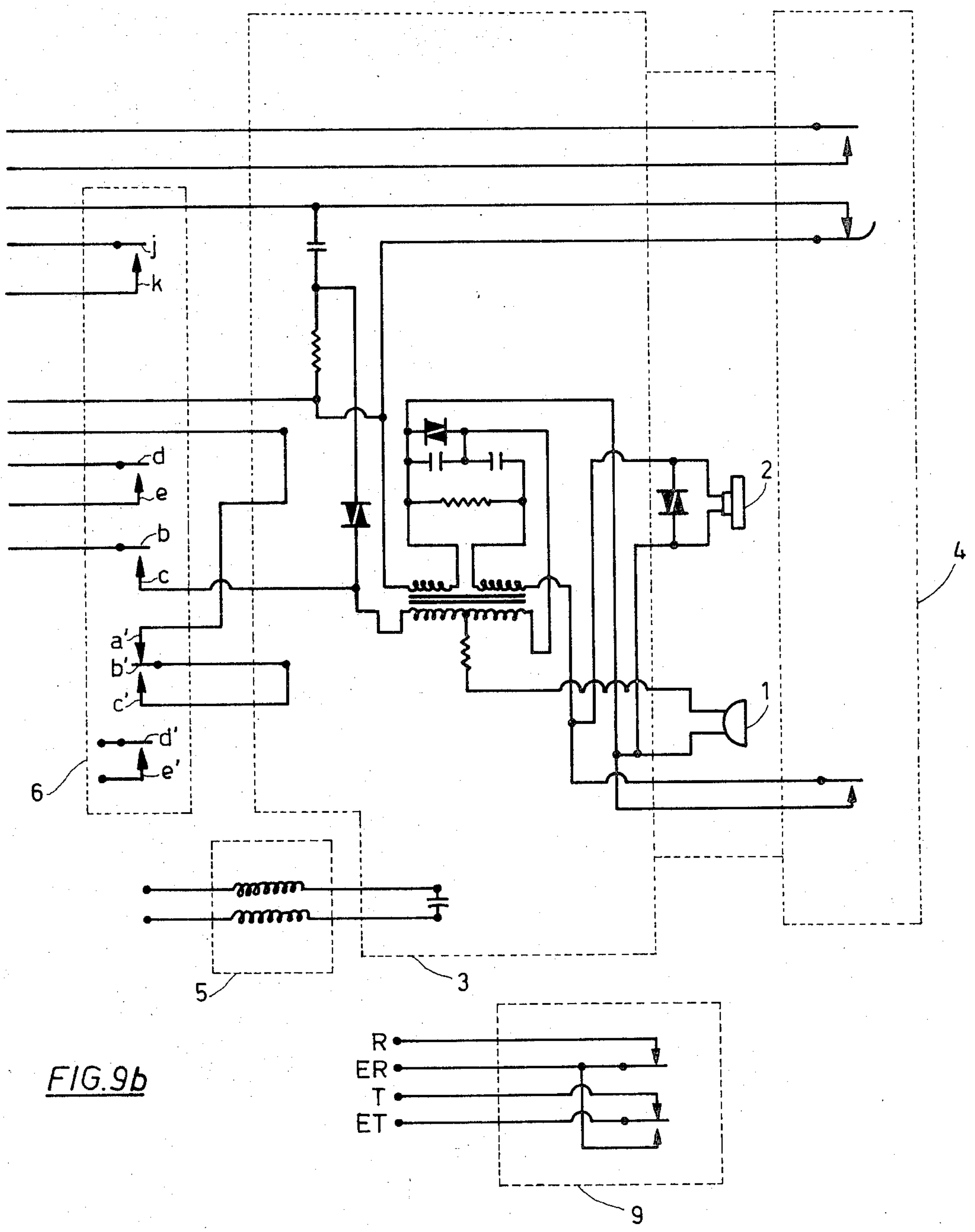

FIGS. *8a* and *8b* show a circuit similar to FIG. 7 but which may be employed with tone dialling subscriber station;

FIGS. *9a* and *9b* show a further embodiment which has alternate line keys and connections over those in the prior embodiments;

FIGS. *10a* and *10b* show a circuit similar to FIG. 9 but which may be employed with a tone dialling subscriber station.

In the drawings identical components are indicated by identical numbers and although the invention is contemplated for use with a subscriber station having multiple telephone sets only one is shown in the drawings for clarity. A transmitter and receiver are indicated at 1 and 2, respectively. The associated network, dial and hook circuits are shown in dotted outline as 3, 4 and 6, respectively. The multiple telephone sets have their corresponding lines connected. A ringer circuit 5, and an exclusion key circuit 9 may be connected across any selected line. A manual signal circuit 8 may be provided and connected with any line or lines as desired.

Hook switch 6 is provided with a plurality of contacts which may be connected in various arrangements as will be described hereafter.

A multi-line key 7 having a hold key 70, of the momentary make-before-break type, and an individual pick-up key for each line such as 71, 72 and 73 for the first, second and third telephone lines, respectively, is provided and this key provides means for connecting the telephone sets, in conjunction with holding circuits such as 10, 20 and 30, one individual to each telephone line, to the telephone lines.

Hold key 70 operates only momentarily and the contacts make before break and remain made until any line key such as 71, 72, or 73 which have been previously operated is released by the action of the hold key 70. The individual line keys 71, 72 and 73 are also such that operation of one releases any other previously operated line key.

Figure 1:
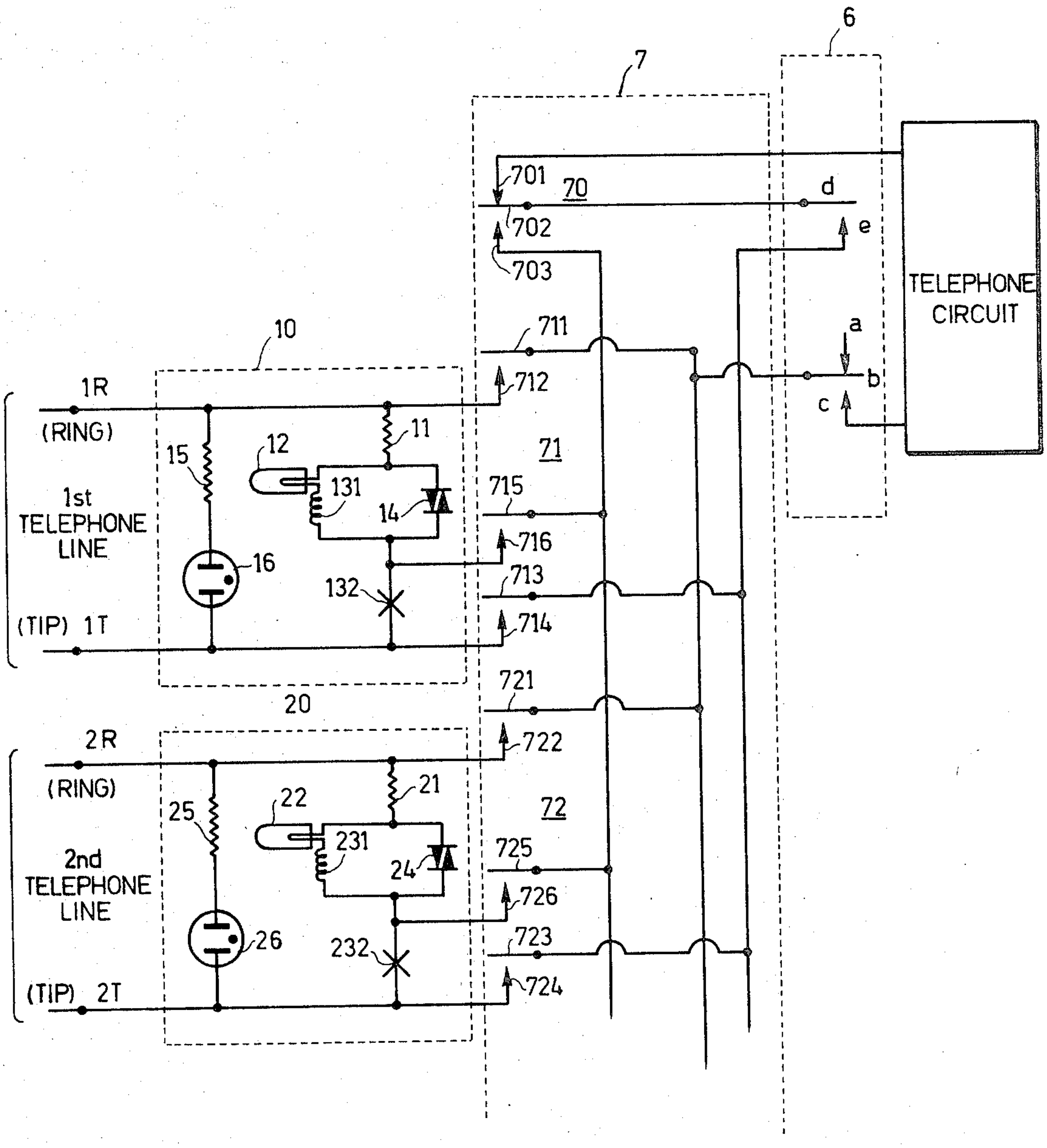
FIG. 1 is a schematic circuit drawing of a hold circuit in accordance with the present invention.

As mentioned, each telephone line is provided with an individual hold circuit. In FIG. 1, terminals IR and IT have a hold circuit 10 connected thereacross and terminals 2R and 2T have hold circuit 20 similarly connected. In these hold circuits the components are numbered in the corresponding decade.

Hold circuit 10 comprises a resistor 11 in series with a parallel combination of a varistor 14, and an incandescent lamp 12 in series with a coil 131, and then in series with reed switch 132. A resistor 15 in series with a neon lamp 16 is connected in parallel with the above combination. The junction of coil 131 and reed switch 132, is connected through one pair of contacts 716 and 715 of its associated line key 71 through hold key 70 and contacts d and e of hook switch 6 back to the other side of reed switch 132 and terminal IT.

The junction of coil 231 and reed switch 232 is similarly connected through contacts 726 and 725 of line key 72 through hold key 70 and contacts *d* and *e* of hook switch 6 back to the other side of reed switch 232 and terminal 2T.

The invention is illustrated by the following analysis using hold circuit 10 for example.

The lowest necessary d.c. current through coil 131 to operate reed switch 132 (hereon referred to as the pull-in current) is always higher than the highest d.c. current to cause coil 131 to release reed switch 132 (hereon referred to as the release current). Therefore, whenever the total available d.c. current from the telephone line is shared between the hold circuit 10 and the telephone circuit 1, 2, 3, 4 and 6, the hold circuit 10 is not made to automatically release itself. The equivalent series resistance of the hold circuit such as 10 is made higher than the equivalent resistance of the telephone circuit for two reasons: one reason is to extend the telephone loop length to as long as practically desirable, another reason is to ensure complete release of the hold circuit under the adverse condition inherent in short telephone loops where there is maximum telephone loop current. The equivalent series resistance of the hold circuit must also be made low enough to draw sufficient d.c. current even under long loop conditions to maintain operation of the distant Central Office relay and therefore ensures satisfactory operation of the hold circuit.

Furthermore, the smaller the differential between the release current and the pull-in current, the easier it will be to release the hold circuit when the hold circuit is shunted with a telephone circuit. Therefore, the telephone loop length may be extended by determining the appropriate equivalent series resistance of the hold circuit and also by making the differential between release current and pull-in current as small as economically possible.

Line Holding

When a telephone call comes in for example on the first telephone line, IR and IT, the Central Office ringing supply ionizes lamp 16 causing it to flash on and off in accordance with the ringing frequency. Resistor 15 ensures that the series impedance of resistor 15 and lamp 16 is of sufficient value to multiple a plurality of telephone lines and also to prevent inadvertent tripping of the distant Central Office line relay.

The call is answered by operating line key 71 and picking up the handset 1, 2 causing hook switch 6 to operate thereby causing the handset 1, 2 and its associated network 3 to be connected to IT and IR and terminate the ringing. To hold the call hold key 70 is momentarily pressed. Terminal IR is connected through resistor 11, the parallel combination of varistor 14 with lamp 12 and coil 131 in series through contacts 716 and 715, contacts 703 and 702 of hold key *e* of hook switch 6, back through contacts 713 and 714 to terminal IT.

Hold key 70 however is a momentary type such that contact 702 first makes with 703 before breaking with 701 and then 702 re-makes with 701 before breaking with 703. While contact 702 is making with contact 703, the line key 71 is caused to release leaving only hold circuit 10 connected across IR and IT.

The d.c. line current instead of flowing through the telephone circuit now flows through hold circuit 10 to energize coil 131. Reed switch 132 is caused to close locking hold circuit 10 across the line.

Lamp 12 remains on as long as the hold circuit is operating. The varistor 14 because of its high dynamic resistance when the d.c. voltage across it is low and low dynamic resistance when the d.c. voltage across it is high protects lamp 12 and coil 131 from excess currents in short loops. The handset 1, 2 may now be placed on hook or off hook without any effect on the hold circuit. Also, the remaining lines and hold circuits operated in the same manner.

To answer the call on "hold" the appropriate line key, say 71, is depressed and the handset picked up. The telephone circuit is thus placed in shunt with the hold circuit 10. The d.c. line current will flow through one path by way of contacts 712 and 711, contacts *b* and *c* through the telephone circuit, back through contacts *d* and *e*, the hook switch 6, and contacts 713 and 714 to terminal IT. The current through coil 131 is sufficiently reduced to open reed switch 132 thereby releasing the hold circuit 10. Only the telephone circuit is left connected to the terminals IR and IT.

Figure 2:
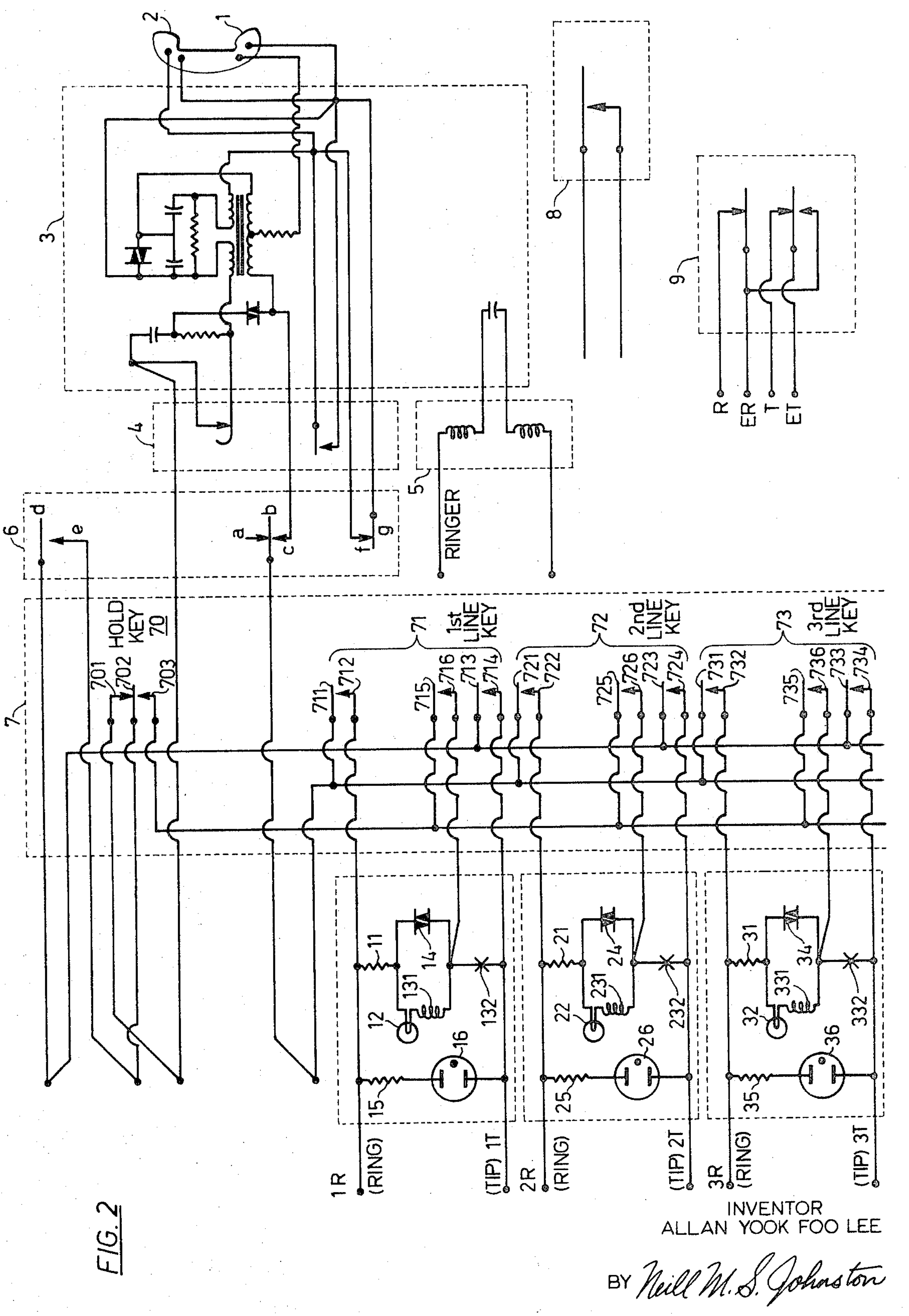
FIG. 2 shows a plurality of line circuits, their associated hold circuits, and a telephone station circuit with optional features in accordance with the present invention.

The circuit illustrated in FIG. 2 shows three lines and more detailed circuitry of the telephone network and the multiple connections. This circuit operates in the same manner as that described in FIG. 1.

Figure 3:
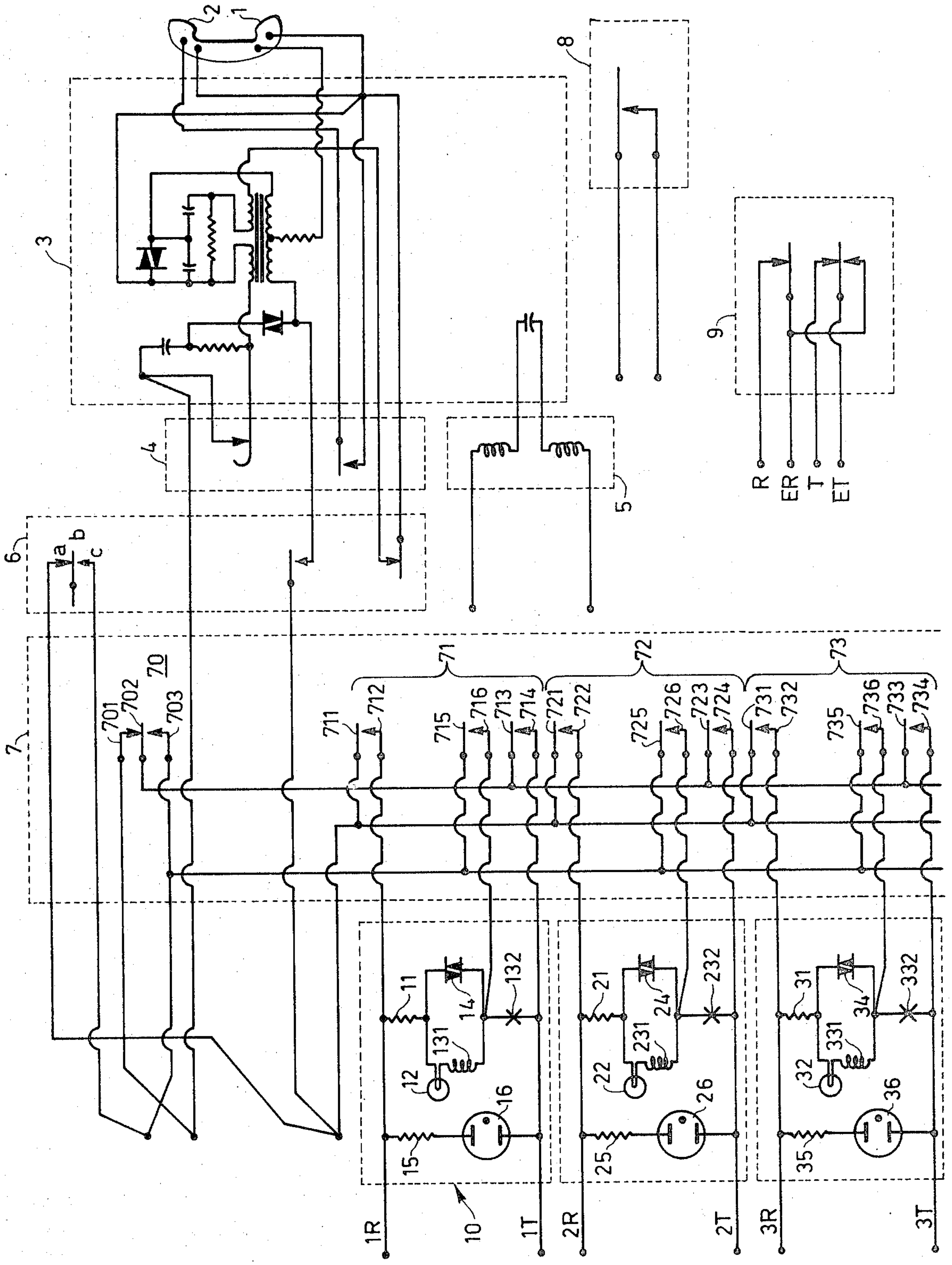
FIG. 3 shows an alternate circuit to that shown in FIG. 2 with different connections between the holding circuits the hook switch, the line key and the hold key.

In FIG. 3 an alternative circuit is shown. Again the corresponding parts are correspondingly numbered. However in this embodiment contact a of hook switch 6 is connected to the R lines (ring side) of each telephone line through the line key selector switch such as 71, 72 and 73, and contact *c* of hook switch 6, is connected to contact 703 of hold key 70. In this circuit when the line key, for example 71, is operated before the hook switch 6 is pressed, contact *b* makes with contact *c* before breaking with contact *a*. A momentary short circuit across the junction of coil 131 and switch 132 and the terminal IR results to ensure release of hold circuit 10.

Figure 4:
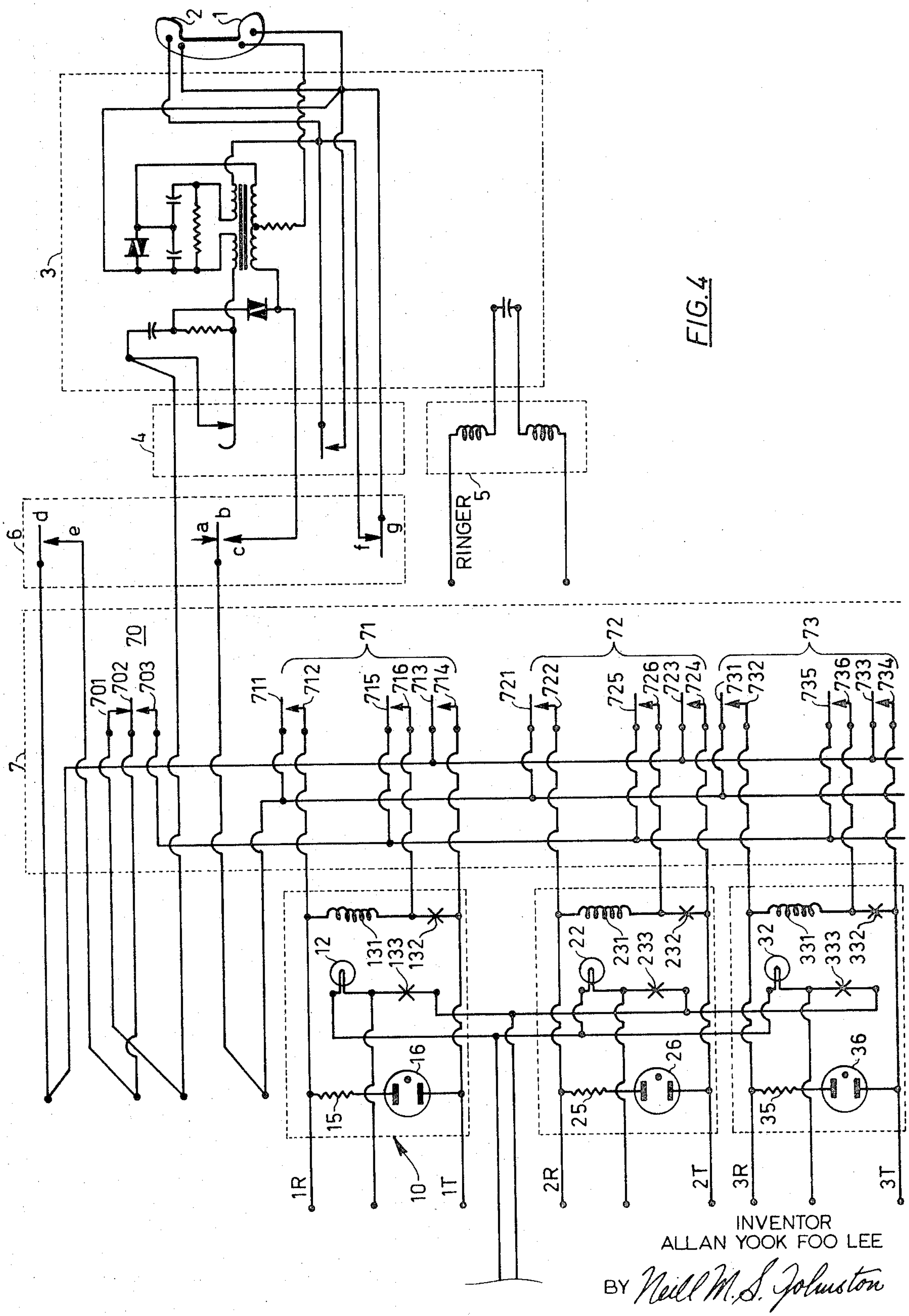
FIG. 4 shows an alternate circuit employing a local power supply for the hold lamps.

In FIG. 4 a further alternative embodiment in which the hold lamps such as 12, 22 and 32 receive their power from an external power supply instead of the d.c. power supply from the telephone line is shown. In this embodiment coil 131 and reed switch 132 are connected as previously across the ring and tip. Lamp 12 and a further reed switch 133 are connected across lines LG and LH to the external power supply which may be either a.c. or d.c., and the junction of the lamp 12 and switch 132 is connected to terminal IH. The reed switches such as 132 or 133 may either be double-pole double-throw contacts or two pairs of contacts from a reed relay or any other equivalent switching mechanism. Coil 131 and reed switch 132 has the equivalent series resistance specified above with respect to the previously described circuits.

As before, an incoming call from the Central Office is indicated by a flashing of neon lamp 16. To answer the call on any of the lines, say line 1, key 71 is operated and the handset is lifted to operate the hook switch 6. These operations terminate the Central Office ringing and connect the telephone circuits 1, 2, 3 and 4 through contacts *d*, *e* and *b*, *c* of hook switch 6 to terminals IR and IT of the first telephone line. If the call is to be held, the hold key 70 is pressed. This action momentarily places a short circuit across the reed switch 132 to allow the d.c. current from terminal IR to go through coil 131 and switch 132 to lock the hold circuit 10 across the line. At the same time reed switch 133 is closed to complete the power supply circuit for lamp 12 and all the other lamps for this line in the multiple. It will thus be seen that the operation of the hold circuit in any one line will be indicated in all telephone sets in the multiple.

To return to the line that has been placed on hold the line key 71 is depressed and the handset is removed from the hook switch 6. The hold circuit is caused to release as previously described.

Figure 5:
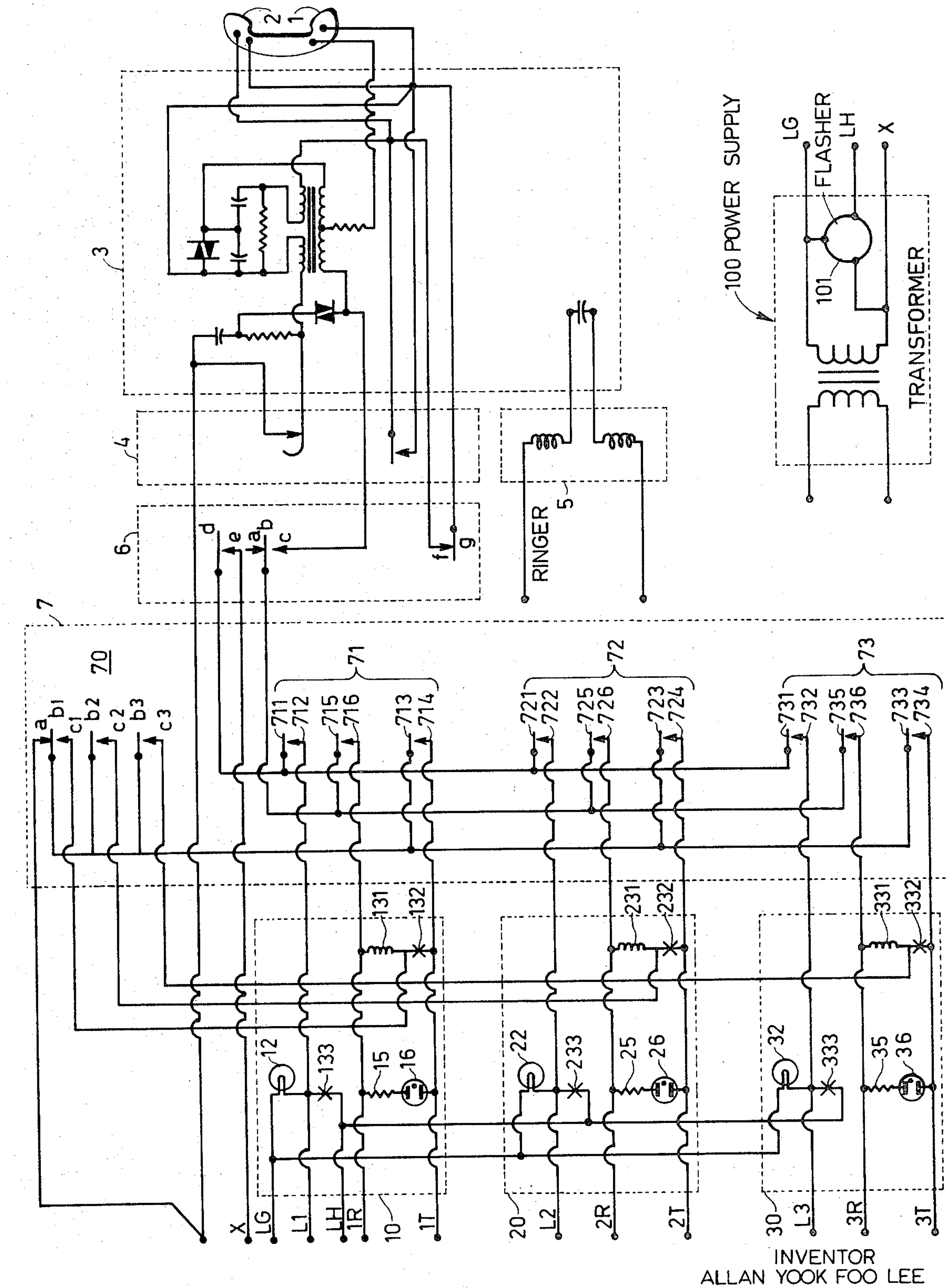
FIG. 5 shows a further circuit employing a local power supply.

In the embodiment shown in FIG. 5, again an external power supply 100 is employed which may be either a.c. or d.c. The source shown in FIG. 5 is an a.c. supply with a flasher 101 connected thereacross. The connection across terminals LG and LH provide a flashing source and the connection across terminals LG and X provides a steady source.

In this embodiment the hold key 70 comprises a plurality of contacts *a*, $b_1$, $c_1$, $b_2$, $c_2$, and $b_3$, $c_3$. Lamp 12 and switch 133 are connected across the flashing power supply terminals LG and LH and in parallel with the corresponding lamp and switch circuits of the corresponding holding circuits 20 and 30. The junction of lamp 12 and reed switch 133 is connected to contacts 711 and 712 of line key 71 and through contacts *d* and *e* of the hook switch 6 to terminal X. The junction of coil 131 and reed switch 132 is connected through contacts *c* and *b* of hold key 70 and contacts 713 and 714 of the line key 71 to terminal IT.

On receipt of an incoming call on the first line neon lamp 16 flashes on and off. Operating the hook switch 6 by lifting the handset off the hook, and depressing line key 71 answer the incoming call and terminates the ringing as previously described. The circuit for lamp 12 is completed from LG through lamp 12 to contacts 711 and 712 to contacts *d* and *e* of hook switch 6 and to terminal X for the steady power source. The lamp 12 for other telephone stations in the multiple system is supplied through the path LI to X. All the lamps for the selected line in all stations in the multiple are simultaneously turned on to indicate that the line is in use.

To hold the line, hold key 70 is pressed, contacts *b*, $b_2$ $b_3$ respectively make with contacts $c_1$, $c_2$, $c_3$, before breaking with contacts *a* to disconnect the telephone circuit from terminals IR and IT so that only coil 131 and switch 132 are connected across the line. As formerly described d.c. current now flows through 131 and causes switches 132 and 133 to be operated. Switch 132 locks the hold circuit across terminals IR and IT and 133 completes the path from a power source through a flasher 101 and the flashing terminal LH to lamp 12 and all the other corresponding lamps for the selected line through terminal LI.

In this manner all the lamps corresponding to the selected line will flash on and off to indicate that the selected line has been placed on hold.

To return to the line, line key 71 is depressed and the handset is lifted off the hook so that the hook switch contacts *b*, *c*, *d*, *e*, *f* and *g* operate. As a result of this operation the d.c. line current is now shared between the hold circuit 10 and the telephone circuit causing reed switches 132 and 133 to be opened and the telephone circuit connected directly to terminals IR and IT. At the same time when reed switch 133 is opened the circuit for lamp reverts to its former state and is connected across terminals LG and X to provide a steady indication that the line is in use. On replacement of the handset the lamp power supply is disconnected. Therefore, all the lamps 12 are turned off.

Figure 6:
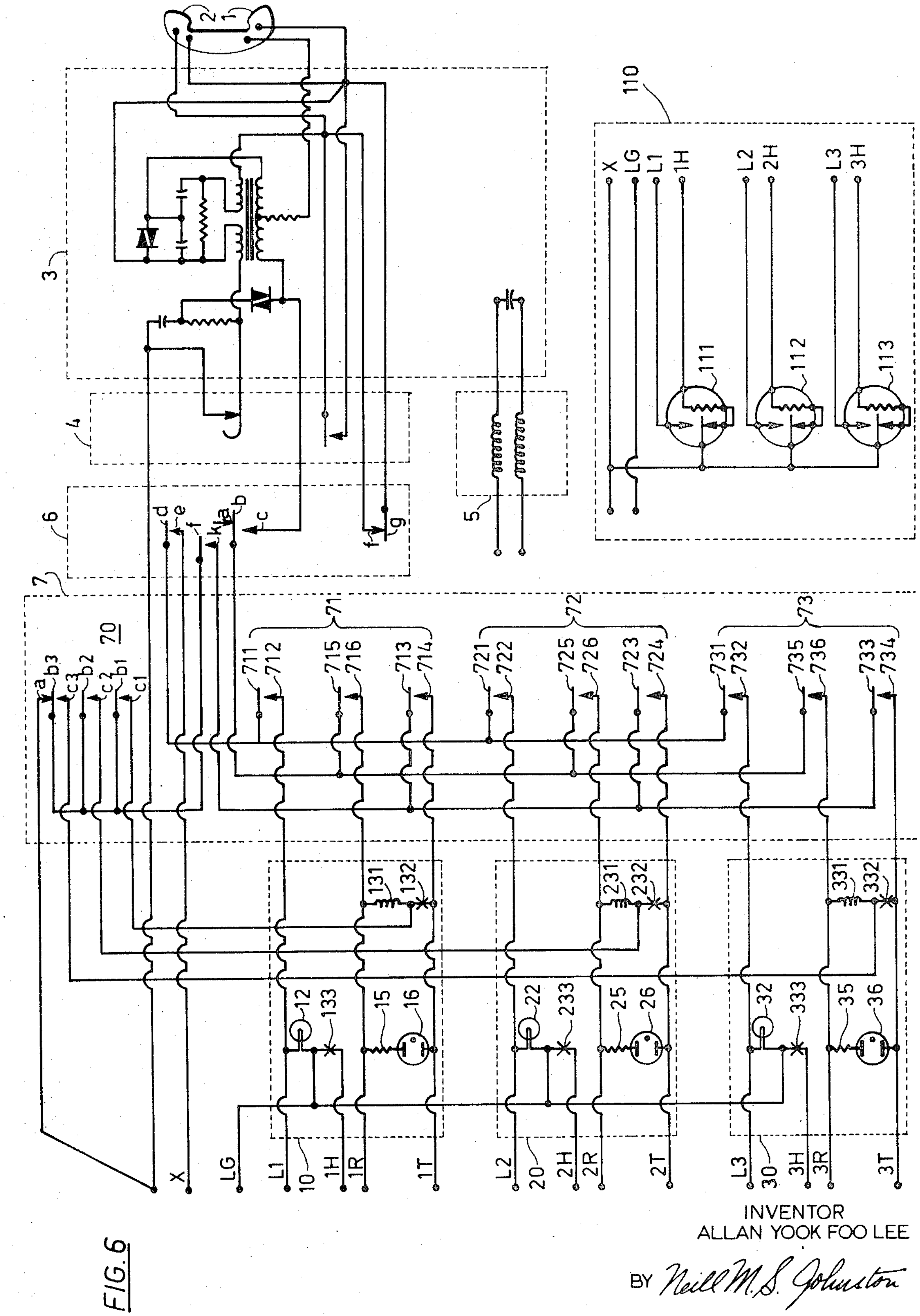
FIG. 6 shows a further alternate circuit in which individual flashers are provided for each telephone line.

In FIG. 6 a further alternative embodiment of the circuit is provided. In this embodiment the hold lamps 12, 22 and 32 are connected so that the flashing power instead of coming from a common flasher is provided by individual flashers and hook switch 6 is provided with a pair of further contacts *j* and *k* to eliminate the possibility of holding a telephone line under the On-Hook condition. A detailed schematic of a flashing supply circuit which may be employed in association with FIG. 6 is indicated at 110. A power supply which may be a.c. or d.c. is connected through terminal X through contacts *e* and *d* of hook switch 6, and through the respective line keys to the lamps 12, 22, 32 respectively and back to terminal LG. The multiple terminals L1, L2, L3 are connected to the lamps 12, 22 and 32 respectively. Terminals 1H, 2H and 3H respectively connect the individual flashers 111, 112, 113 to reed switches 133, 233 and 333. As with the embodiment illustrated in FIG. 5 the junction of coil 131 and reed switch 132 is connected to the *b* and *c* contact of hold key 70 and 50 are the remaining junctions of the corresponding holding circuits of the remaining lines so that the operation of these lines and their response to operation of the hold key 70 is the same.

When an incoming call is received, it is answered by depressing line key 71 in the case of line 1 and lifting the handset off the hook to operate the hook switch 6. Power then flows from X through contacts *e* and *d* of hook switch 6, through contacts 717 and 718 of line key 71 to lamp 12 and to the lamps which are multipled by way of terminal LI and returns through LG so that all the lamps for the selected line are indicated as being on in all the telephone stations of the multiple system.

The presence of contacts *j* and *k* of hook switch 6, as mentioned previously prevents the possibility of inadvertently holding a telephone line under the On-Hook condition. Before the handset is lifted off the hook and the hook switch 6 is operated contacts j and k of hook switch 6 are normally opened and therefore disconnect the circuit path from hold key 70 to any hold circuit.

As with the embodiment in FIGS. 4 and 5 to hold an incoming line the hold key 70 is operated momentarily. This causes disconnection of the telephone circuit from the line leaving the series combination of coil 131 and reed switch 132 connected to the line and the d.c. line current will flow through line 131 to operate both switches 132 and 133. Switch 132 locks the hold circuit 10 across the line and switch 133 completes the path for the power supply from the flashing source 110 and the flasher 111 to supply flashing power from LI to all the lamps in the circuit. The flashing indicates holding of the selected line.

In this embodiment one flasher such as 111, 211 and 311 is required for each line. Each flasher is turned on only when necessary. This reduces the maintenance and prolongs the life of the flasher.

From the foregoing description it will be seen that a holding circuit has been provided with visual indication when the line is being held and with different visual indication when the line is in use causing the hold circuit to release automatically.

In FIG. 7 a further alternative embodiment of the invention is provided. In this embodiment, the hold key 70 is provided with a plurality of sets of transfer contacts, one set for each hold circuit. Moreover, each circuit path that is in parallel to the reed switches 132, 232 and 332 is provided with a pair of normally open contacts in hook switch 6. The said pair of normally open contacts in hook switch 6 is to eliminate the possibility of holding each telephone line under the ON-HOOK condition. As illustrated with hold circuit 10 for the first line, the said circuit path that is in parallel to reed switch 132 is completed only when hold key 70 is pressed after a telephone call is established by depressing line key 71 and lifting the handset to operate hook switch 6. Completion of the said circuit path holds the telephone call on the first line as previously described. However, as described in the embodiments shown in FIGS. 5 and 6, pressing hold key 70 connects contacts $b_1$, $b_2$ and $b_3$ to $c_1$, $c_2$ and $c_3$ simultaneously. Therefore, the junction of coils 131 and reed switch 132 of hold circuit 10 and the corresponding junctions of hold circuits 20 and 30 are all interconnected. In the process of attempting to hold a telephone call, the said interconnection of all corresponding junctions of the hold circuits presents interference among the hold circuits. This interference, under the normally momentary operation of hold key 70, is short and tolerable. However, as long as hold key 70 stays pressed the interference persists.

The embodiment shown in FIG. 7 minimizes the said interference. In FIG. 7 each set of transfer contacts in hold key 70 is such that the b contact makes with the c contact before breaking with the contact a when hold key 70 is pressed. Therefore, the interference during the process of attempting to hold a telephone call is minimized to the short when all three sets of *a, b, c* contacts in hold key 70 are simultaneously made.

Figure 8A:
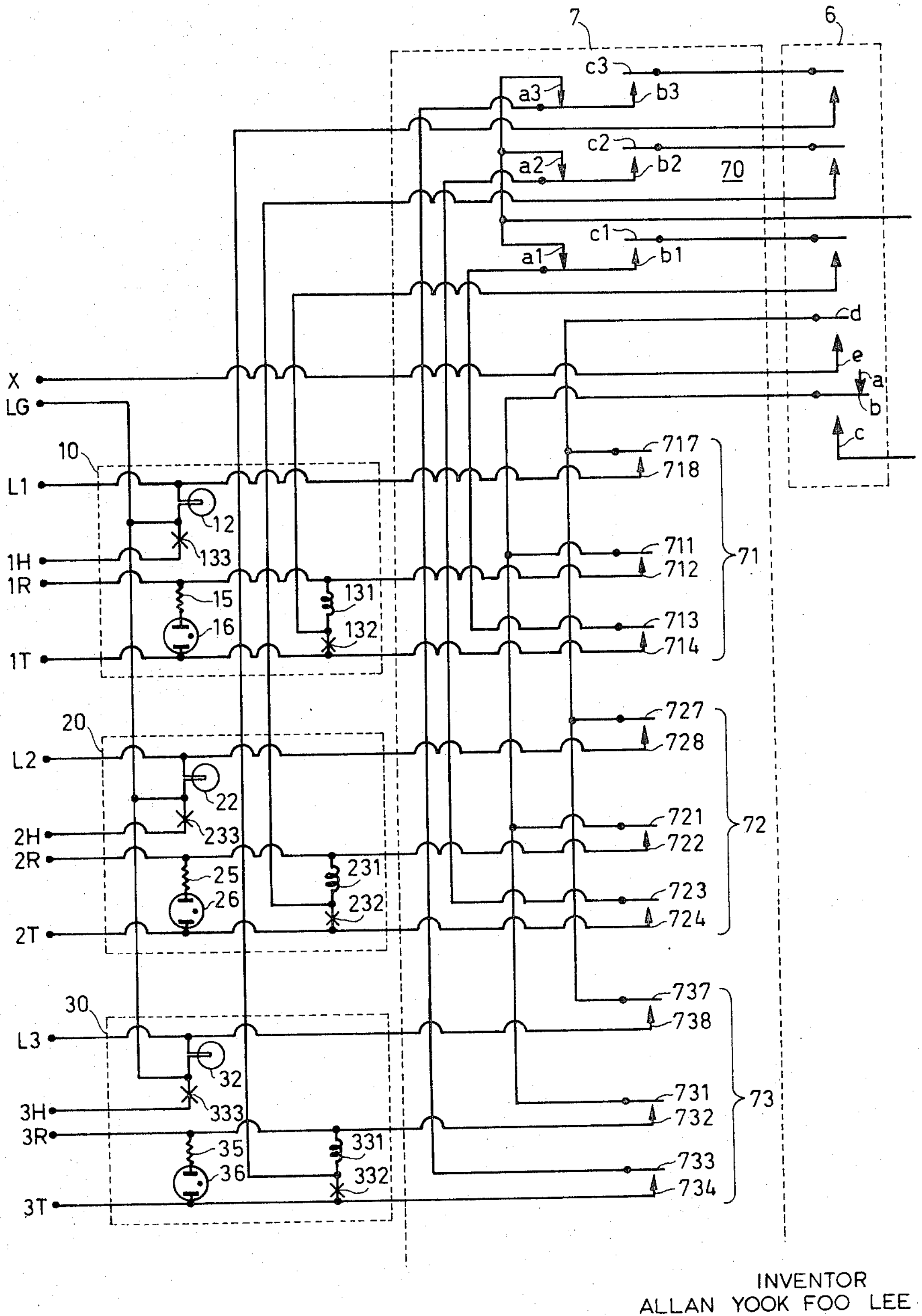
Figure 8B:
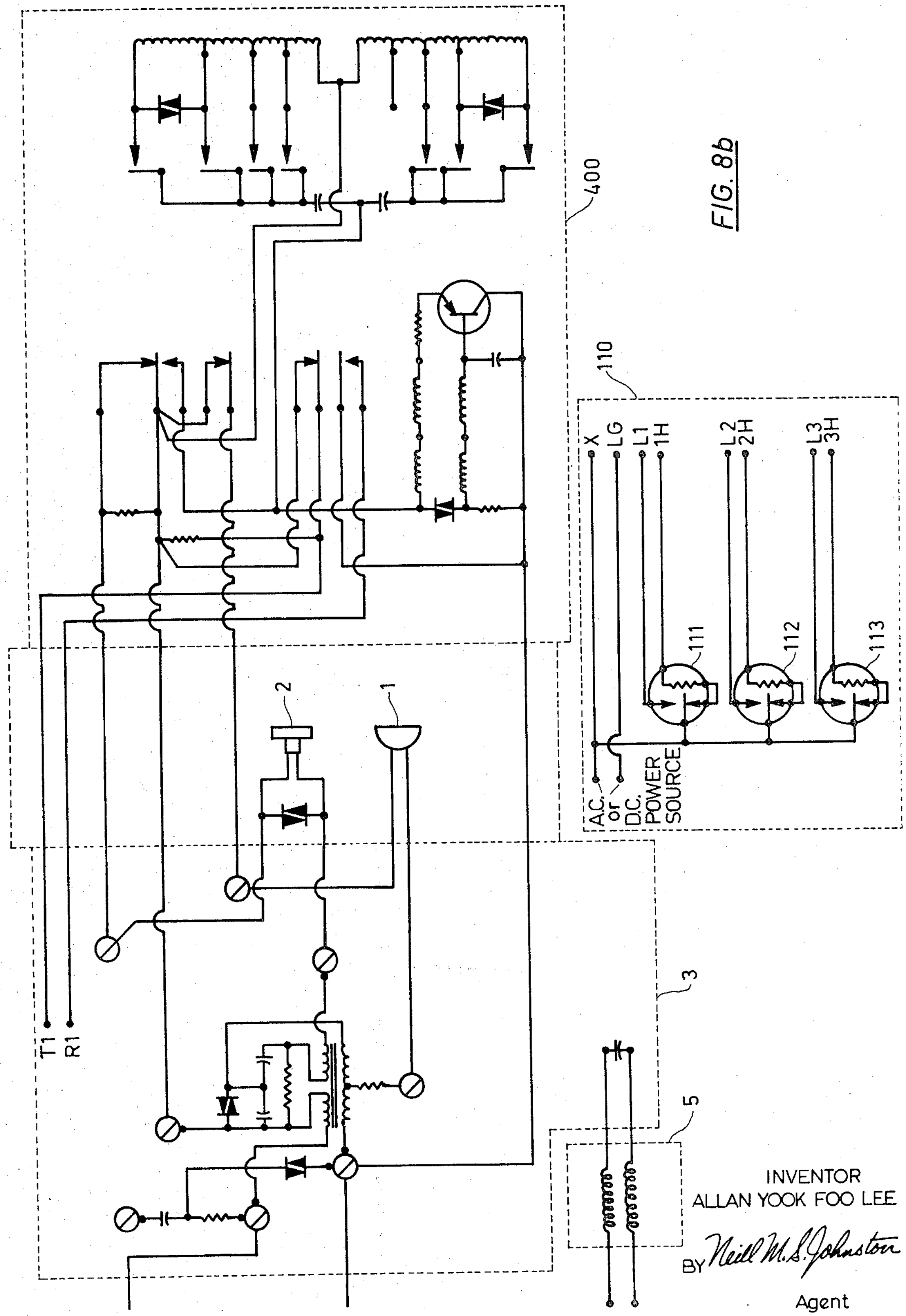

In FIG. 8 the hold circuits 10, 20, 30, the multi-line key 7, and the hook switch 6 all have the same configurations and operations as those described in FIG. 7. However, FIG. 8 is provided with a tone dialling circuit 400 instead of a conventional dial 4.

A still further alternative embodiment is shown in FIG. 9. This embodiment has several modifications over the previous embodiments. The multi-line key 7 is provided with two additional line keys 74 and 75. Each of line keys 71, 72, 73, 74 and 75 is further provided with an additional pair of contacts. Power supply 210 comprises an electronic circuit which provides a steady power source across terminals LG and X, three individual flashing power sources across terminal pairs L1 and X, L2 and X, L3 and X, and also a d.c. talking battery source across terminals 5R and 5T. Each flashing source is associated with a particular telephone line. The d.c. talking battery source provides the biasing d.c. current and the necessary source impedance for the telephone circuit 1, 2, 3, 4 and 6 for direct intercommunication between one telephone station and another within the multiple system. Power supply 210 also contains a portion of each of hold circuits 10, 20 and 30. All telephone stations with terminals corresponding to those in power supply 210 may be multipled. All other terminals such as TI, RI, ON, N, AG, IB, RR, LI, 4R, 4T and 44 are provided from auxiliary functions which may be employed in conjunction with a telephone station circuit. Line keys 74 and 75 have identical contacts and connections to the telephone circuit. Line key 74 may be used as a manual signal circuit with power source coming from terminals LG and X. Ringer 5 and exclusion key 9 may be connected across any selected telephone line.

The use of any one of the telephone lines and the operation of the corresponding hold circuit are as described previously. For example, on the first line, depressing line key 71 and lifting the handset to operate hook switch 6 connect the telephone circuit 1, 2, 3, 4 to the said line by the path IR to contact 712 and 711, to contacts *b* and *c* of hook switch 6, through network 3 and handset 1, 2 to contacts *a* and *b* of hold key 70, to contacts *j* and *k*, contacts 713 and 714, to terminal IT. At the same time, the steady power source operates lamp 12 and all the other lamps 12 in the multiple system by the path from LG through lamps 12 to contacts 718 and 717, contacts *d* and *e* of hook switch 6 to terminal X. Illumination of all lamps 12 indicates that the first line is in use. Subsequently operation of hold key 70 puts the said first line on hold. This operation short circuits reed switch 132 by the path from 14 to contacts 716 and 715, to contacts *c* and *b* of hold key 70, contacts *j* and *k* of hook switch 6, to contacts 713 and 714, to terminal 17. Line key 71 is then released by the mechanical linkage and action of hold key 70 and therefore disconnects the telephone circuit 1, 2, 3, 4, 6 and leaves only hold circuit 10 locking across the first line. At the same time, reed switch 133 is also caused to close, thereby completing the on and off triggering path to a triac 211. Triac 211 is a bilateral thyristor and is therefore turned on and off accordingly to provide the flashing power to all lamps 12 through the path L1 to LG.

Figure 10A:
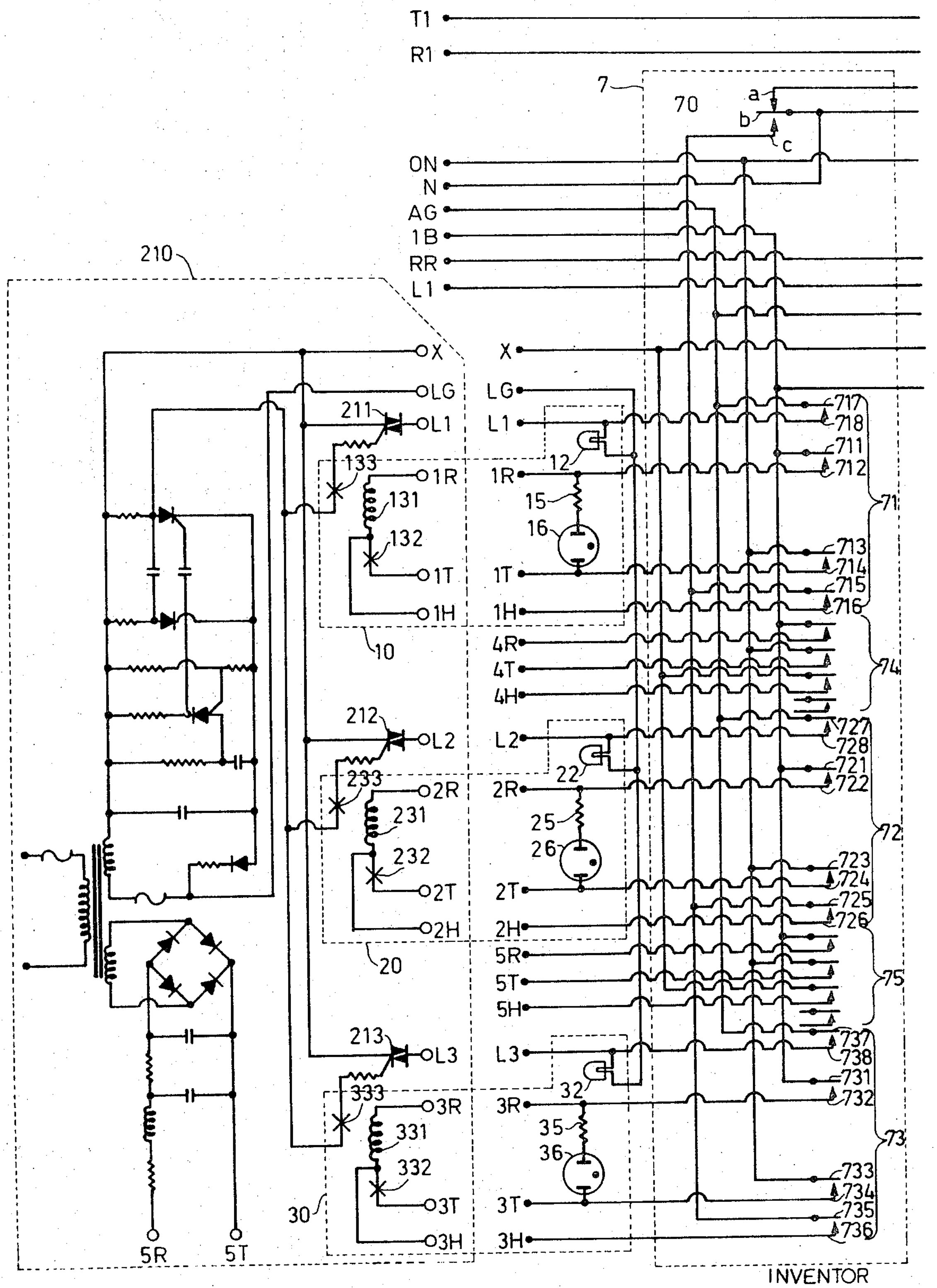
Figure 10B:
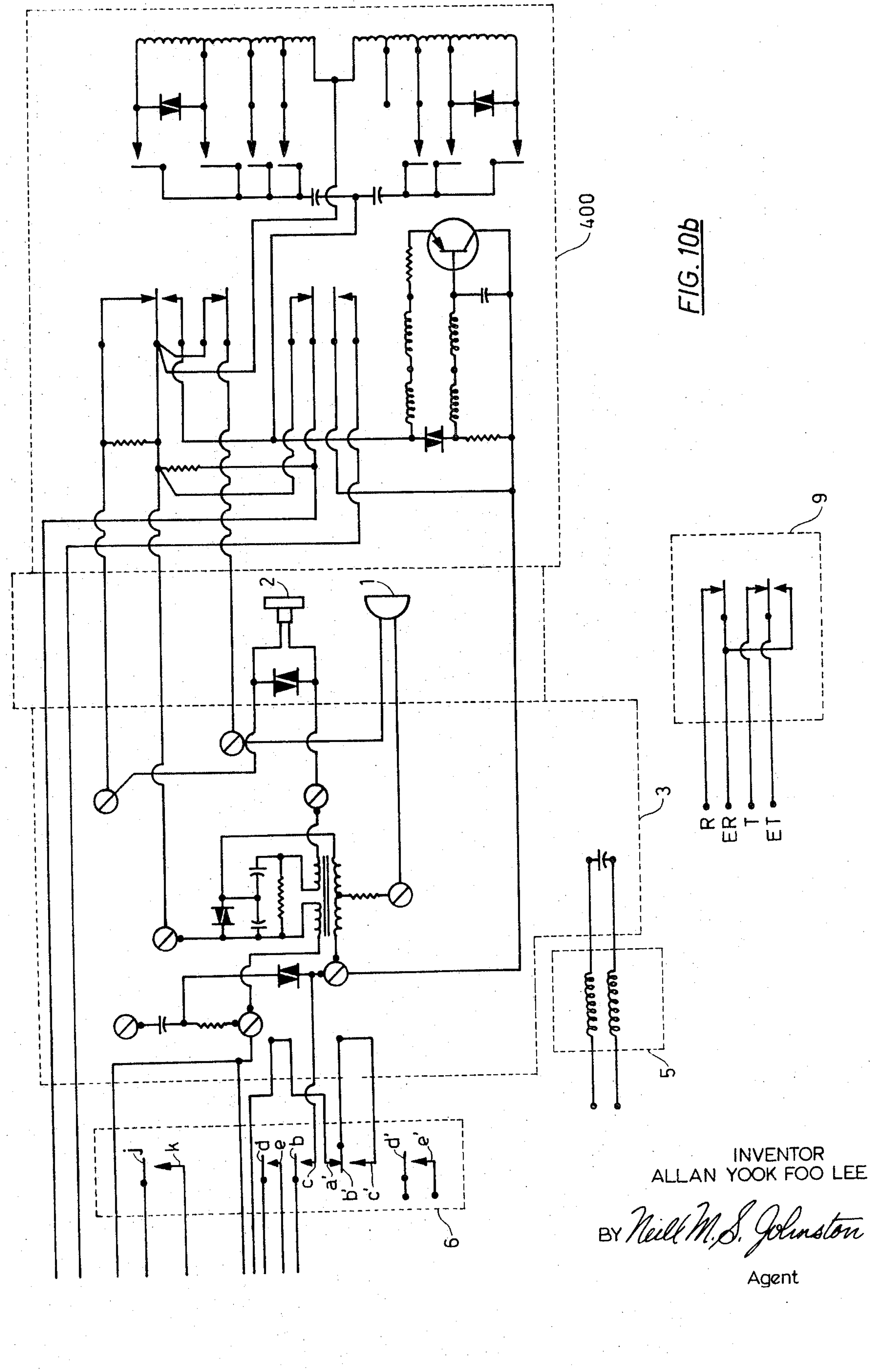

The second and third telephone lines are respectively connected to terminals 2R and 2T, 3R and 3T, and are operated in the same manner as the first line;

The embodiment shown on FIG. 10 offers an alternative to use a tone dialling circuit 400 instead of the conventional dial 4 in FIG. 9.

While the invention is being described with specific reference to several embodiments and each embodiment is illustrated with only three telephone lines, it will be understood that a plurality of telephone lines may be employed. Furthermore, each telephone station may be provided with either the conventional dial or the tone dialling circuit and also that other equivalent circuits may be employed without departing from the spirit and scope of the invention defined in the appended claims.

I claim:

1. In a key telephone set adapted to be connected to a plurality of telephone lines, said telephone set having a telephone circuit, a hook switch, and a plurality of interlocking keys including line keys, one for each telephone line, and a common hold key; a plurality of hold circuits, each one associated with a respective telephone line, each hold circuit comprising:

a. a current-actuable holding bridge having an operate current and a release current; the impedance of said bridge being greater than the impedance of the telephone circuit, b. means responsive to the momentary operation of the hold key for connecting the bridge across its associated telephone line, and c. means responsive to the subsequent operation of a line key associated with said telephone line for connecting the telephone circuit across said bridge thereby causing the current through the bridge to decrease to an amount less than said release current and the bridge to be released from the telephone line.

2. A holding circuit as defined in claim 1 wherein the holding bridge comprises a relay coil in series with a make contact operable thereby and wherein the hold key comprises a transfer switch of the make-before-break type having center, make and break contacts, the free end of the relay coil being connected to one side of the associated telephone line and connectable through a first make contact of the associated line key and a first make contact of the hook switch to one side of the telephone circuit, the free side of the relay coil make contact being connected to the other side of the incoming telephone line and connectable through a second make contact of the line key, a second make contact of the hook switch and the center and break contact of the transfer switch to the other side of the telephone circuit, the junction of the coil and its associated make contact being connectable through a third make contact of the line key to the make contact of the transfer switch.

3. A holding circuit as defined in claim 2 wherein said relay coil and associated make contact comprise a reed relay.

* * * * *